Aug. 26, 1958 W. D. ALLISON 2,849,242
PRESSURE CONTROL MEANS FOR LOAD COMPENSATOR MECHANISM
Filed Jan. 31, 1955 3 Sheets-Sheet 2
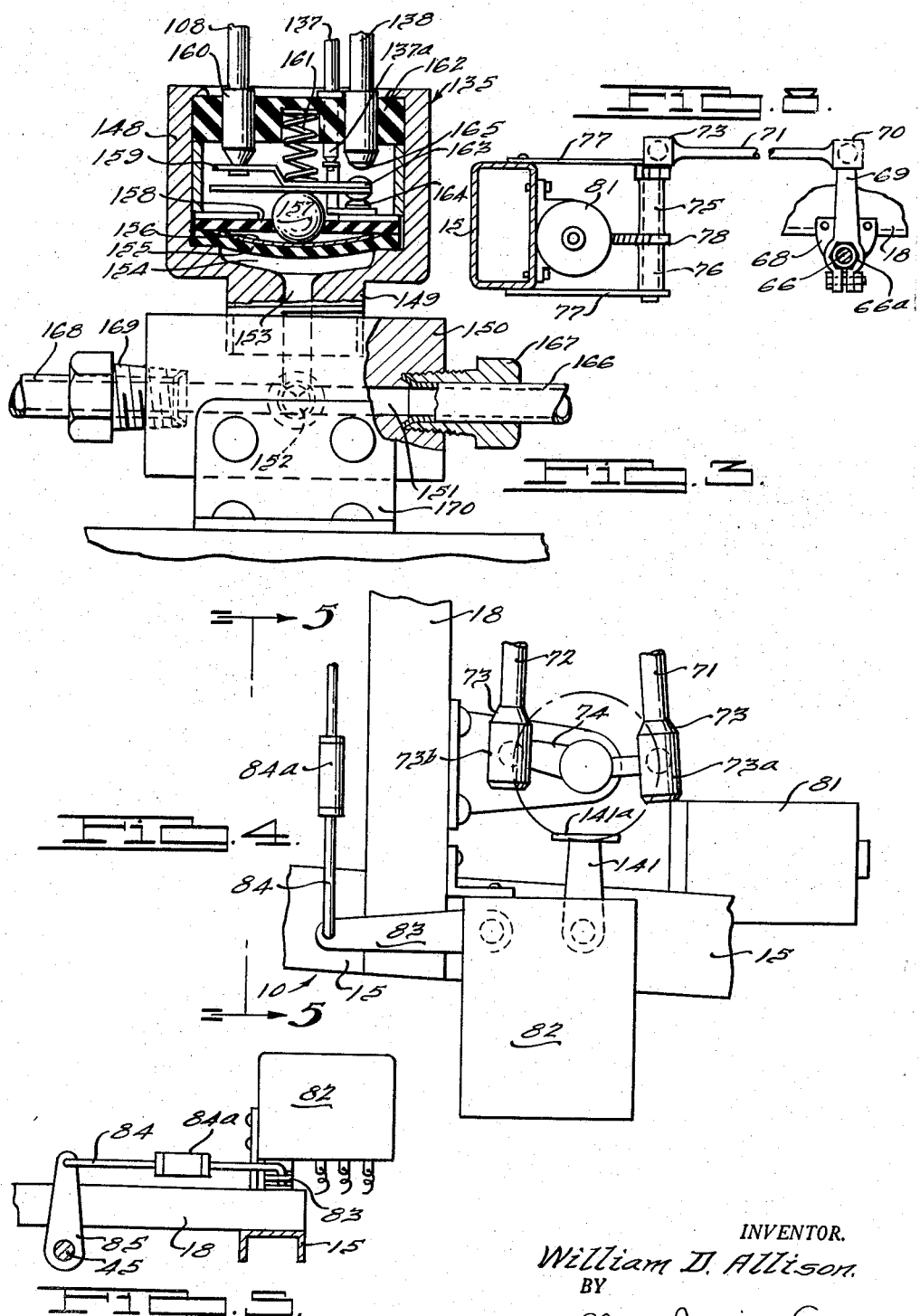
INVENTOR.
William D. Allison.
BY
Elmer Jamison Gray
ATTORNEY.

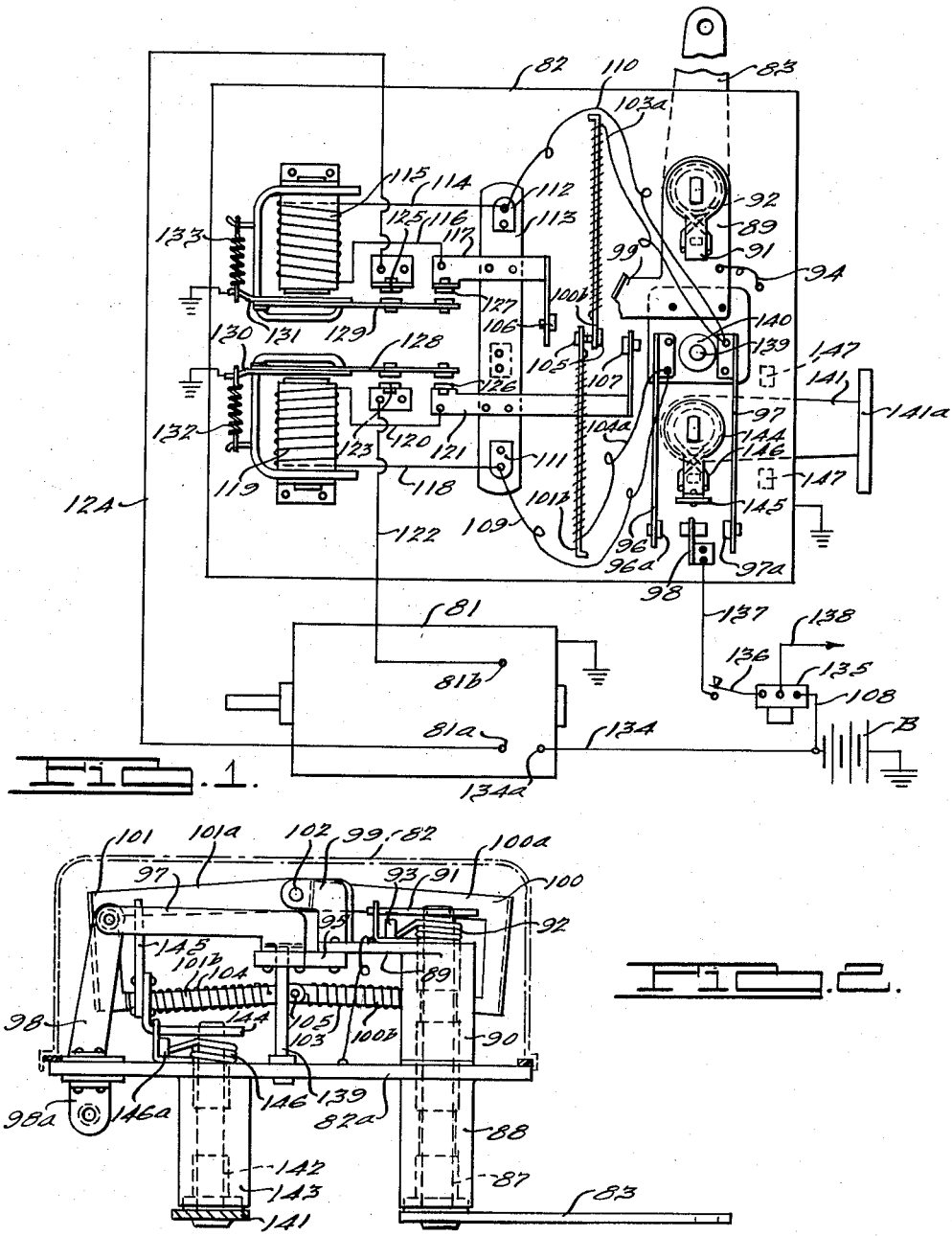

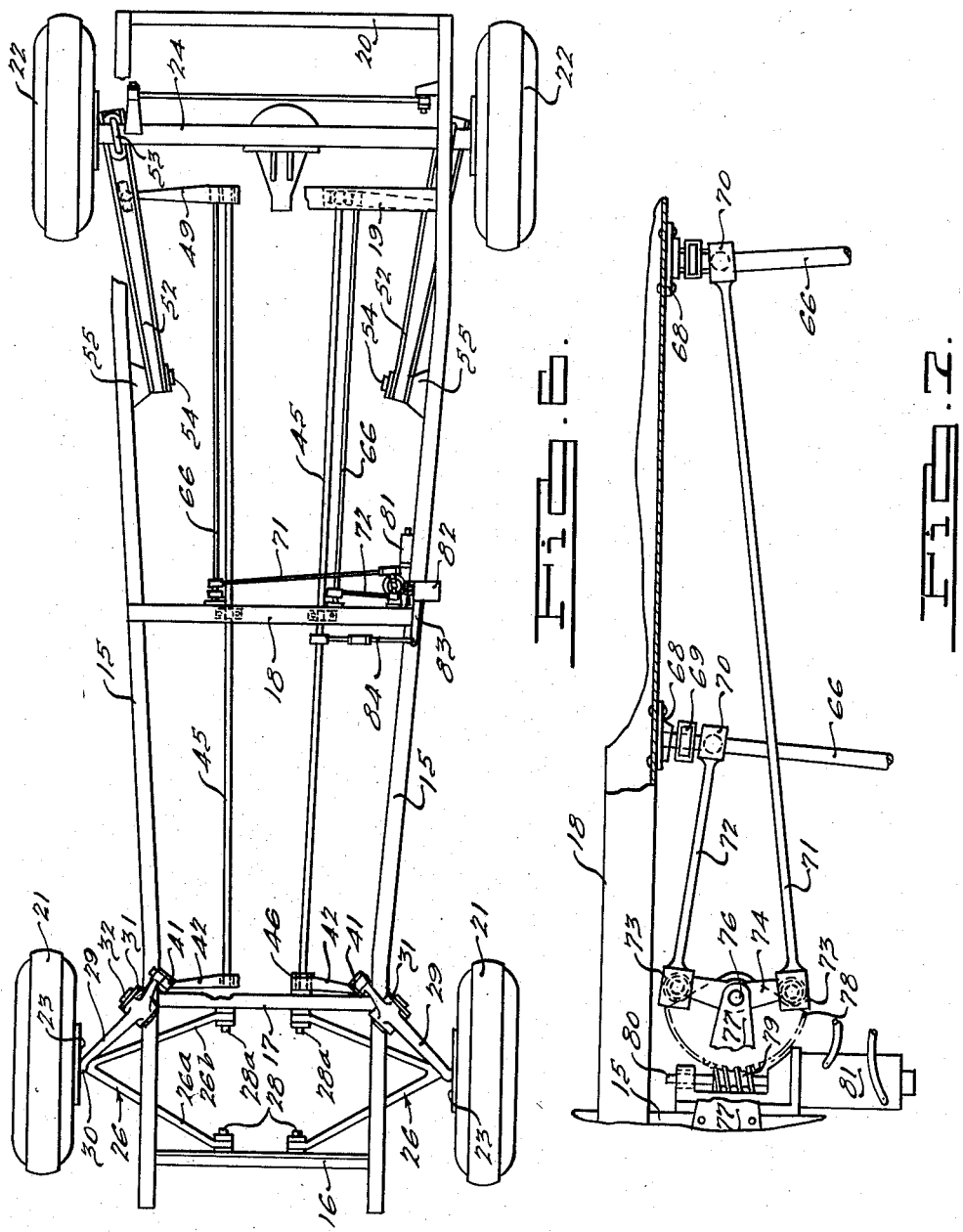

United States Patent Office 2,849,242
Patented Aug. 26, 1958

2,849,242

PRESSURE CONTROL MEANS FOR LOAD COMPENSATOR MECHANISM

William D. Allison, Grosse Pointe Farms, Mich.

Application January 31, 1955, Serial No. 484,949

13 Claims. (Cl. 280—124)

This invention relates to motor vehicles and particularly to spring suspensions therefor. The invention is applicable to various types of motor vehicles such as automobiles of the so-called pleasure or passenger types, busses, trucks, ambulances and commercial vehicles. For the purposes of illustration the invention has been shown herein as embodied in a motor vehicle having a chassis or frame structure adapted to be utilized in a passenger or pleasure type vehicle.

The vehicle is provided with front and rear wheels and a main spring suspension or spring means interposed between the frame or body structure of the vehicle and the wheels. As a main spring means I prefer to utilize torsion bar or torsional spring means connecting each pair of front and rear wheels at a side of the vehicle in such manner as to enable vertical forces to be transmitted in corresponding directions to the vehicle frame adjacent opposite ends thereof in response to vertical motion of either wheel. In addition to the main spring suspension there is provided a compensating means, which may be spring means of the torsional kind, operable to supplement or modify the spring effort or resistance of the main spring means so as to levelize the frame under conditions where an increase in static load is placed at one or either end of the vehicle. In the use of a main spring suspension common to the front and rear wheels and operable as above described a change in static load adjacent the rear or front of the vehicle has the effect of varying the riding height in opposite directions of the front and rear, thus putting the frame or vehicle out of level. The compensating means, one form of which is incorporated in the illustrated embodiment, functions under such conditions to restore the frame or vehicle to substantially a level position. A substantially uniform riding height of the vehicle body may thus be assured regardless of varying loads carried thereby.

In the embodiment herein illustrated the front wheels of the vehicle are supported for independent up and down movements by means of upper and lower swinging suspension arms or levers. Although the rear wheels are shown as supported by means of a transverse so-called solid axle, it will be understood that they may be otherwise supported, such as through the medium of swing axles or upper and lower swinging suspension arms or levers for each rear wheel.

The load compensating means incorporated in the illustrated embodiment preferably comprises a torsional spring or torsion bar supplementing or capable of modifying the effective effort of each main torsion bar. The compensating springs, as herein shown by way of example, may be connected to a pair of rear wheel levers which may also be connected to the main torsion bars when utilized as the main spring suspension means. These compensating springs may be torsionally deflected as the result of static load changes on the vehicle so as to levelize the vehicle, this being accomplished in the present embodiment through the medium of variable leverage mechanism which is preferably power operated, such as by means of a servo-motor which may be electrically actuated or otherwise. Actuation of the motor is preferably performed automatically in response to static load changes occurring after a predetermined elapsed interval of time. A delayed action switch means is utilized in the present instance to control operation of the compensating motor in either direction, and when so operated the compensating springs will be torsionally deflected in one direction or the other through the variable lever mechanism.

An important object of the present invention is to provide means associated with the compensator switch device for preventing operation of the load compensating means during sustained deceleration of the vehicle by application of the brakes which often causes the front end of the vehicle to dip and in many instances places the vehicle out of level condition for an interval of time exceeding the interval of delay of the switch. This is accomplished according to the invention by incorporating in the line from the battery to the switch a fluid pressure switch operable by brake pedal actuation to interrupt the battery line to the compensator switch thereby rendering the compensator motor inoperative during the period that the hydraulic or pneumatic brakes of the vehicle are applied. When thus interrupting operation of the compensator switch the pressure switch may also, if desired, connect the battery line to the brake stop light.

This application is a continuation-in-part of my application Serial No. 413,253, filed March 1, 1954.

Other objects of this invention will appear in the following description and appended claims, reference being had to the accompanying drawings wherein like reference characters designate corresponding parts in the several views.

Fig. 1 is a plan view of the compensator switch device.

Fig. 2 is a side elevation thereof.

Fig. 3 is an enlarged fragmentary vertical section illustrating the brake pedal operated pressure switch device.

Fig. 4 is an enlarged fragmentary plan view illustrating parts of the compensating mechanism.

Fig. 5 is a fragmentary vertical section taken substantially through lines 5—5 of Fig. 4 looking in the direction of the arrows.

Fig. 6 is a fragmentary plan view of a motor vehicle chassis provided with a vehicle spring suspension of the torsional kind.

Fig. 7 is an enlarged fragmentary plan view, partly in section, illustrating the load compensator mechanism embodied in the vehicle shown in Fig. 6.

Fig. 8 is an enlarged transverse sectional elevation taken through a part of the mechanism shown in Fig. 7.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the accompanying drawings there is illustrated, by way of example, a vehicle chassis having road wheels supporting the frame or body through the medium of a spring suspension which in the present embodiment is preferably of the torsional or torsion bar kind. In the interest of clarity the vehicle superstructure or body and details of the power plant and driven mechanisms have been largely omitted from the drawings. As illustrated, the chassis or body frame is shown, by way of example, as comprising spaced longitudinal sills or main side frame members 15 of box-like tubular construction rigidly connected together by means of suitable cross frame members 16, 17, 18, 19 and 20, the front cross frame members 16 and 17 being of drop-type construction. The vehicle is provided with a pair of front dirigible wheels 21 and a pair of rear driven wheels 22. Each front wheel is carried by any conventional type of upright spindle support 23. The rear wheels 22 are connected together in the present embodiment by means of a solid type tubular axle 24 through which extend the drive shafts for the rear wheels.

Each front wheel 21 is supported for independent up and down movement by means of upper and lower swinging suspension arms or levers. The lower relatively long suspension arm or lever 26 is preferably of wish-bone or fork-like construction pivotally connected at its outer end at 27 to the lower end of the spindle support or carrier 23. The longitudinally spaced inner ends of the lower suspension lever arm 26 are pivotally connected at 28 and 28a to the frame members 16 and 17, respectively. The upper relatively short suspension lever arm 29 is pivotally connected at its outer end at 30 to the upper end of the spindle support or carrier 23. This upper suspension lever arm 29 extends from its outer pivotal connection 30 inwardly and rearwardly with respect to the lower suspension arm 26, it being noted from a consideration of Fig. 6 that the upper suspension arm extends at an oblique angle with respect to the lower suspension arm. Thus, as distinguished from conventional practice the upper suspension arm or lever 29 angles rearwardly and does not lie in the same central plane as the lower suspension arm. The upper suspension arm or lever 29 for each front wheel extends above and crosses the adjacent frame member 15. The lever arm 29 is pivotally connected to a bracket 31 by a transverse pivot pin or stud 32 thereby permitting the lever arm to swing up and down about the axis of the pivot pin.

The inner end of each lever 29 is pivotally connected to a vertical and downwardly extending link or strut 41. The lower end of each strut 41 has a pivotal connection with the outer end of a lever arm 42.

The main spring suspension for the vehicle comprises a main longitudinal torsion bar 45 connected to the front and rear wheels 21 and 22 at each side of the vehicle. The main torsion bars 45 may, as desired, be of solid or tubular construction and when installed are initially stressed or deflected by winding or twisting them angularly a predetermined amount up to, for example, 90° to 120° so as to support the sprung weight of the vehicle. As illustrated in Fig. 6 the forward ends of the main torsion bars 45 terminate proximate to the rear side of the cross frame member 17. The forward end of each main torsion bar is upset to provide an enlarged hex portion splined or keyed within a correspondingly shaped socket or opening in the inner end of the associated lever arm 42. By this construction the inner end of each lever arm 42 is fixed to the forward end of the associated main torsion bar. The inner end of each lever arm is supported on a frame bracket 46 in such manner as to provide a rolling pivotal connection between the inner end of the lever arm and the frame.

In view of the foregoing described connection between the forward end of each main torsion bar 45 and the adjacent front wheel 21, it will be understood that upward vertical motion or displacement of the front wheel will be transmitted from the spindle support 23 to the outer end of the upper suspension lever 29, thereby swinging this end upwardly. Since the lever 29 is pivoted intermediate its ends at 32 to the frame, the inner end of the lever 29 will swing downwardly and this motion will be transmitted through the strut or transmitting link 41 to the outer end of the lever arm 42 thereby swinging this end in a downward direction. This downward swinging motion of the lever arm 42 will twist or torsionally deflect angularly the forward end of the main torsion bar 45.

The rear ends of the main torsion bars 45 are also upset to provide enlarged hex end portions which are splined or keyed within correspondingly shaped sockets or openings in the inner ends of rear lever arms 49 which as shown in Fig. 6 extend laterally in opposite directions from the main torsion bars 45. The inner end of each lever or lever arm 49 is pivotally connected to the lower end of a depending frame member or bracket which is rigidly attached at its upper end to the frame cross member 19.

With the rear wheels 22 connected by means of axle 24 I prefer to provide a pair of rearwardly diverging torque arms 52 attached at their rear ends by means of yokes 53 to the outer ends of the axle 24 and pivotally connected at their forward ends at 54 to brackets 55 carried by the main frame members 15. The outer end of each rear lever or lever arm 49 is operatively and pivotally connected to one of the torque arms 52.

It will be noted that the swinging levers or lever arms 42 and 49 attached respectively to the front and rear ends of each main torsion bar 45 extend in the same direction outwardly from the main torsion bar. However, due to the levers 29 pivoted intermediate their ends on the frame member 15 and connecting the front wheels through vertical struts 41 with the outer ends of the front levers 42, it will be understood that the levers 42 and 49 at each side of the vehicle will torsionally deflect angularly or twist the associated torsion bar 45 in opposite directions in response to corresponding vertical motions of the front and rear wheels. In other words, up and down movement of a front wheel or a rear wheel will result in angular torsional deflection of the main torsion bar 45 in directions opposite to the angular torsion deflection thereof produced by corresponding up and down movement of the other wheel at the same side of the vehicle. As a consequence, either arm or lever 42 or 49 is effective to torsionally deflect angularly the torsion bar 45 in opposition to the other arm or lever, thereby to transmit vertical forces in corresponding directions to the frame adjacent opposite ends thereof in response to vertical motion of either wheel.

It will be understood that vertical swinging motion of the rear levers 49 is responsive to vertical swinging motion of the torque arms 52 which, being connected at their rear ends to the rear axle 24, will respond to vertical motion of the rear wheels. It will also be understood that the levers 49 may be otherwise connected at their outer ends to the rear wheels so as to swing up and down in response to corresponding motions of the rear wheels.

In the present embodiment of the invention the main spring suspension comprising the torsion bars 45 is supplemented by compensating means, preferably spring means of the torsion kind, at each side of the vehicle operable to vary or modify the spring effort or resistance of the main spring means so as to maintain the frame substantially level under conditions where changes in static load occur at one end or the other of the vehicle. In the present instance the compensating means is provided at the rear of the vehicle and comprises a torsion bar 66 for each rear wheel. The spring torsion bars 66, as in the case of the main torsion bars 45, are selected as to cross-sectional size and torsional characteristics to suit the particular vehicle, each compensating torsion bar being preferably of less diameter or cross-sectional size than the associated main torsion bar since normally it is only required to exert appreciably less torsional resistance than the associated main torsion bar.

In the present embodiment, as illustrated in Fig. 6, each compensating torsion bar 66 extends parallel to and alongside the associated torsion bar 45 and the rear end is upset to provide an enlarged hex portion keyed or rigidly secured within a correspondingly shaped socket in the inner end of the associated lever arm 49 closely adjacent the connection thereto of the main torsion bar 45. The forward end of each compensating bar 66 is provided with a round pilot portion, see Figs. 7 and 8, freely extending and supported within an opening in the lower end of a hanger bracket 68 riveted at its upper end to the cross frame member 18. Rearwardly of the pilot portion each compensating bar is formed with an enlarged hex portion 66a fitting within a correspondingly shaped hex opening in the lower end of a lever 69. This lower end of the lever is bifurcated and through a suitable bolt is clamped to the hex portion 66a, as shown in Fig. 8.

As illustrated in Figs. 7 and 8 the upper end of one lever 69 has a ball and socket connection 70 with the outer end of a relatively long transmitting member or link 71. The other lever 69 has at its upper end a similar ball and socket connection 70 with the outer end of a relatively short transmitting member or link 72. The inner ends of the transmitting links 71 and 72 have similar ball and socket connections 73 with the outer ends of a generally horizontal operating or transmitting lever 74. The transmitting lever 74 is attached at its mid-point to the upper end of a vertically extending tubular sleeve 75. This sleeve is rotatable through suitable bearing or bushing means on a shaft 76 extending therethrough and attached at the upper and lower ends thereof to a pair of vertically spaced bracket plates 77 riveted at their outer ends to one of the main frame members 15. The lever 74 is thus capable of swinging horizontally in one direction or the other about a vertical axis extending centrally through the sleeve 75 and shaft 76.

Fastened to the tubular sleeve 75, to the upper end of which the transmitting lever 74 is attached, is a worm sector gear 78. Meshing with this gear is a worm 79 attached to the armature shaft 80 of a reversible electric motor 81 bolted to the inner side of the adjacent main frame member 15. The worm gearing 78 and 79 provides a form of reduction gear means between the motor 81 and the driven member or transmitting lever 74.

The compensating motor 81 for simultaneously varying the angular deflection of the compensating torsional springs 66, thereby to set them at the desired angular adjustments to increase or decrease the spring resistance at one end of the frame and compensate for changes in static loads so as to maintain the frame level, is actuated in one direction or the other through delayed action compensator switch means contained in a suitable casing 82 mounting above one of the frame members 15, see Figs. 5 and 6. This compensating switch means, hereinafter described, includes a swinging control lever 83 to the outer end of which is pivoted a horizontally and inwardly extending link 84 adjustable as to length by a turnbuckle device 84a. The inner end of this link is pivotally connected to the upper end of a lever 85 which is rigidly attached at its lower end to one of the main torsion bars 45. The connection of the lever to the main torsion bar is preferably located at or close to the neutral point of the main torsion bar, namely, the point at or near the middle of the bar at which point no torsional twist or deflection of the bar occurs when both ends of the bar are twisted corresponding amounts in opposite directions by the levers attached thereto. The neutral point may also be defined as the point where no torsional deflection of the main torsion bar occurs whenever there is no relative change in elevation of the front and rear of the vehicle frame or body structure.

As stated above, the delayed action compensator switch is housed within a casing 82 which comprises, in addition to a suitable cover, a bottom wall 82a. Referring to Fig. 2, rock shaft 87 extends through the wall 82a and is carried by a fixed bearing sleeve 88 attached to the wall. The lever 83 is attached to the lower end of the rock shaft 87. A conducting carrier plate 89 is attached to the upper end of a sleeve 90 which is loose or rotatable on the upper end of the rock shaft 87. A transmitting lever 91 is fixed to the upper end of the shaft 87. Coiled around this end of the shaft is a transmitting spring 92 having projecting spring arms engageable selectively by a projecting arm of the lever 91 upon turning the rock shaft in one direction or the other. Turning motion of the rock shaft consequent to swinging motion of lever 83 is yieldingly transmitted by the swingable lever 91 to the carrier plate 89 through the spring 92, one or the other of the spring arms of which is adapted to engage a lug 93 on the carrier plate to swing the same in one direction or the other, as shown in Figs. 3 and 4.

The carrier plate 89, which forms an electrical conductor, is grounded to the casing by a wire 94. Riveted to the lower end of the plate 89 is an insulated or non-conducting piece 95 to which is riveted a pair of spaced spring contact arms 96 and 97 having contacts 96a and 97a respectively at the outer ends thereof. Interposed between the movable contacts 96a and 97a is a fixed contact arm 98 attached to the casing wall 82a, see Fig. 2, and terminating in a double contact engageable selectively by the contacts 96a and 97a upon swinging the carrier plate and its attached piece 95 in one direction or the other. The contact 98 is electrically connected to a terminal 98a on the outside of the wall 82a, this terminal being insulated from the wall.

The carrier plate 89 is formed with a bracket flange 99, see Figs. 1 and 2. Adjacent this flange is a pair of similar horseshoe-like bimetallic elements 100 and 101, see Fig. 2. Arms 100a and 101a of these elements overlap at their adjacent ends and are riveted at 102 to the end of the bracket flange 99. By this construction the bimetallic elements are carried by the plate 89 and swing back and forth therewith in response to turning motion of the rock shaft 87 in one direction or the other. The bimetallic elements also include arms 100b and 101b. Insulated electrical resistance wires 103 and 104 are wound around the arms 100b and 101b. The adjacent ends of the arms 100b and 101b are overlapped, see Fig. 1, and carry contact rivets or terminals 105, the inner ends of which abut or are proximate to each other. The bimetallic elements are temperature compensated by virtue of their horseshoe shape, whereby contacts 105 are not subject to appreciable displacement under changes in ambient temperature. The adjacent ends of the resistance wires near the contacts 105 are based and soldered to the arms. The opposite outer ends of the resistance wires 103 and 104 form continuations of conductor wires 103a and 104a respectively. The end of the wire 103a is connected to the contact arm 97 and the wire 104a is connected to the contact arm 96. Secured to the casing wall and spaced at opposite sides of the movable contacts 105 carried by the bimetallic elements are fixed contact members 106 and 107.

In addition to the wires 103a and 104a leading from the contacts 97 and 96 to the resistance windings of the bimetallic elements, there are provided conductor wires 109 and 110 leading from the contacts 96 and 97 respectively to terminals 111 and 112 carried by a member or bar 113 of non-conducting material, such as Bakelite. From terminal 112 a conductor line 114 leads to the winding of a solenoid or relay 115 and thence a return line 116 leads to a fixed conductor bar 117 which carries contact 106. Likewise from terminal 111 a conductor wire 118 leads to the winding of a solenoid or relay 119 and thence a return wire 120 leads to a fixed conductor bar 121 which carries contact 107. The solenoids 115 and 119 are oppositely wound as shown.

A conductor line or wire 122 leads from terminal 81b of the compensating electric motor 81 to a fixed contact 123. A second conductor line or wire 124 leads from terminal 81a of the motor 81 and thence to a second fixed contact 125 spaced laterally from the contact 123. Fixed contacts 126 and 127 are also carried by conductor bars 121 and 117 respectively. Two spaced contact members 128 and 129 project between the pairs of opposed contacts 123, 125 and 126, 127 and are carried by levers 130, 131, respectively, movable under the influence of the solenoids 119, 115, respectively, when energized. The outer ends of the levers 130, 131 are grounded, and connected to said ends are springs 132, 133 which, acting through the levers, urge the contact members 128 and 129 away from the pairs of contacts 123, 125 and 126, 127 when the solenoids are deenergized. Member 128 carries a pair of spaced contacts confronting but normally separated from contacts 123 and 126. Likewise member 129 carries a pair of spaced contacts confronting but normally separated from contacts 125, 127.

As shown in Fig. 1 current is conducted from the battery B to the electric motor 81 by means of an input conductor line 134. Also from the battery B a conductor wire 108 leads to a pressure switch 135, hereinafter described, and thence to a manually off and on switch 136 mounted on the instrument panel. From this switch a conductor line 137 leads to the fixed contact 98 of the compensator switch.

Since the spring contact arms 96 and 97 of the compensator switch unit are yieldable or flexible it is desirable to provide a mechanical stop means for limiting the range of swinging movement of the carrier plate 89 so as to ensure proper spacing between the contacts 105 of the bimetallic elements and the fixed contacts 106 and 107 whenever the switch is actuated in one direction or the other through the lever 83. This is accomplished by means of a stop pin 139 secured to the base 82a of the casing and projecting upwardly through an opening 140 in the plate 95. The diameter of the aperture 140 is predetermined so as to provide the desired range of lateral swinging movements in opposite directions of the plate members 95 and 89, these movements being limited by engagement of the edge of the aperture with the stop pin.

In the operation of the compensator switch device it will be understood that rock shaft 87 will be turned in one direction or the other through lever 83, link 84 and lever 85 when the main torsion bar 45 is angularly deflected or turned in one direction or the other due to a change in elevation at one end or the other of the vehicle frame. This results in swinging the carrier plate 89 in one direction or the other thereby effecting engagement of either contact 96a or contact 97a with the fixed contact 98. This results in energizing one or the other of the resistance windings and causing gradual deflection or bending of one of the bimetallic elements until, after a predetermined time delay, contact is made between one of the contact members 105 and one of the contacts 106 and 107. A circuit will then be completed through one of the solenoids 115, 119 resulting in contact being made between arm 128 or arm 129 and contact 123 or contact 125. When this occurs a circuit through motor line 122 or motor line 124 is grounded. The conductor line 134 to the motor is insulated at the motor and at all times electrically connected to terminals 81a and 81b. Hence, when either one of the lines 122, 124 is grounded the motor 81 will be energized and will operate in one direction or the other. A further detailed description of the operation of the compensator switch device, if desired, may be found in my copending application Serial No. 454,492, filed September 7, 1954.

It is important that the range of swinging movement of lever 74 be controlled between predetermined limits as determined by the lifting capacity of the compensating bars. Accordingly, provision is made in the compensator switch unit for stopping the motor whenever the lever 74 is swung in either direction to one or the other limit of its selected range of movement.

A limit switch lever 141 is attached at its inner end to a rock shaft 142 mounted in suitable bearings in a sleeve 143 attached to the bottom wall 82a of the casing, see Fig. 2. The upper end of the shaft 142 projects into the casing and attached to this end of the shaft is an angle lever 144. Riveted to the angular end of this lever is a circuit breaking member 145 which, in the neutral position of the lever 145 as shown in Fig. 1, lies equidistant from the spring contact arms 96 and 97. For the purpose of yieldingly urging the lever 144 to its neutral or normal position, a return spring 146 is provided. This spring is coiled around the upper end of the rock shaft 142 and is provided with two projecting spring arms engaging opposite edges of the lever 144. A stop or lug 146a, secured to the wall of the casing, is interposed between the spring arms and provides an abutment for one spring arm when the other arm is tensioned by swinging motion of the lever 141. Mechanical stops 147 for the lever 141 are also disposed at opposite sides of the lever to provide fixed limits beyond which the lever cannot swing.

Assuming the contacts 97a and 98 are in engagement, when the transmitting lever 74 is swung to one extreme position the ball socket member 73a at the end of transmitting link 71 will engage an enlarged head 141a on the lever 141 and thereby swing the lever 141 and cause the member 145 to engage spring contact arm 97 and separate the contacts 97a and 98. This will interrupt the circuit to the compensator switch and stop the motor 81. If the contacts 69a and 98 are in engagement and lever 74 is swung in the opposite direction to its predetermined limit of travel, ball socket member 73b will contact the end 141a of lever 141 and thereby cause the member 145 to engage spring contact arm 96 and separate the contacts 96a and 98 resulting in stopping the operation of the motor. The stops 147 are spaced sufficiently far apart so that lever 141 will cause separation of the contacts 96a and 98 or 97a and 98 to stop the compensator motor before the lever can engage either of the stops 147. These stops are for safety purposes to prevent over-travel of the levers 74 and 141 which might result in damage to the switch mechanism.

Referring to Fig. 3, the brake pedal actuated pressure switch 135 comprises a suitable casing 148 having a threaded nipple 149 adapted to be threaded into a tapped hole in a junction block 150. This block has a main conduit or fluid passage 151 extending therethrough and also a branch conduit 152 communicating with the conduit 151 and adapted to be connected to pipe lines leading to the brake actuating cylinders for the rear wheels. A duct or passage 153 extends through the nipple 149 and communicates with the passage 151, this duct 153 also communicating with a chamber 154 in the casing 148 at one side of a flexible diaphragm comprising, in the present instance, a disk 155 of rubber or other elastic material to the upper face of which is bonded a thin metal disk 156.

The diaphragm disk 156 is engaged by a transmitting ball 157 held in place within an aperture in a suitable retainer 158 of insulating material. The transmitting ball 157 is in engagement with the underside of a double spring switch member or arm 159 electrically connected to a terminal 160 which in turn is electrically connected to the conductor or input line 108 leading from the battery. A compression spring 161 engages the upper side of the switch arm 159, the upper end of the spring being seated in a recess in a cover disk 162 of the casing.

The end of the switch member 159 opposite to the terminal 160 is provided with a double contact 163 engageable selectively with spaced fixed contacts or terminals 164, 165. The terminal 164 is electrically connected to a terminal 137a which in turn is connected to the conductor line 137 leading to the compensator control switch. The terminal 165 is connected to a conductor line 138 which leads to the vehicle brake stop light.

Communicating with passage 151 in the junction block 150 is a conduit or pipe line 166 attached to the block 150 by a coupling 167. The pipe line 166 leads to the conventional master cylinder of the vehicle hydraulic brake system. Also communicating with the passage 151 is a conduit or pipe line 168 attached to the junction block by a coupling 169, this pipe line 168 leading to the brake actuating cylinders for the front wheels of the vehicle. The junction block 150 may be attached to a frame member of the vehicle by an angle bracket 170, preferably at a point proximate to the compensator switch device.

As is customary, the master cylinder of the vehicle hydraulic brake system is provided with a piston which is actuated by depression of the brake pedal to force fluid under pressure through the line 166. In the present instance the fluid under pressure is forced through passage 151 and thence through pipe lines 152 and 168 to the rear and front wheel cylinders of the brake system. When the brakes are thus operated fluid under pressure will also be forced from passage 151 through duct 153 into the chamber 154 in the casing 148.

During normal operation the spring 161 holds the contact 163 in engagement with contact or terminal 164 thereby causing electric current to flow from the battery through input line 108 and switch 159 to the terminal 137a and thence through conductor line 137 to the compensator switch. However, upon depression of the brake pedal to actuate the hydraulic brakes the fluid under pressure in chamber 154 resulting therefrom will move the diaphragm 155, 156 upwardly thereby causing transmitting ball 157 to raise the switch arm 159 and lift contact 163 away from terminal 164 into engagement with terminal 165. This results in interrupting the flow of current from line 108 to line 137, rendering the compensator switch inoperative, and connects battery line 108 with line 138 causing energization of the conventional brake actuated stop lights. From the foregoing it follows that whenever the hydraulic brakes of the car are actuated the compensator switch is disconnected from the battery line and the construction is preferably such that the brake stop lights will be energized by a circuit passing through the pressure switch 135. Although reference has been made herein to the conventional hydraulic brake system with which the pressure switch 135 is associated, it will be understood that the pressure switch may be utilized with any conventional pneumatically actuated vehicle braking system.

I claim:

1. In a vehicle having brakes, a stop light and a control means for a vehicle load compensating mechanism having a servo-motor, comprising an electrical switch provided with relatively movable contacts adapted to be engaged in response to a change in static load on the vehicle thereby to effect actuation of said servo-motor, a pressure switch device having a first terminal adapted to be connected to one of said contacts and a second terminal adapted to be connected to the vehicle stop light, said device also having a switch normally connecting said first terminal with a source of electric energy, and fluid pressure actuated means controlled by fluid pressure imposed thereon by the operation of the vehicle brakes for moving said switch member from said first terminal to connect said second terminal with said source.

2. In a vehicle having brakes and a control means for a vehicle load compensating mechanism having a servo-motor, comprising a control switch device therefor adapted to be actuated in response to a change in static load on the vehicle, delayed action control means for said switch device, a casing having a fluid passage adapted to be connected to a fluid pressure conduit for the vehicle brakes for introducing fluid under pressure into said casing upon operation of the brakes, a movable switch in said casing normally maintained in position to connect said control switch device with a source of electric energy, and means in said casing responsive to fluid pressure in said fluid passage imposed by the operation of the vehicle brakes for moving said switch to disconnect said switch device from said source of electric energy.

3. A compensator control device for a motor vehicle including a control circuit having an input conductor line from a source of electric energy, a fluid actuated device including a movable pressure switch interposed in said input line, said device including a first terminal in said circuit normally engaged by said pressure switch and a second terminal electrically connected in a circuit to the vehicle stop light, and means responsive to pressure consequent to operation of the vehicle fluid brakes for actuating said pressure switch to interrupt said control circuit at said first terminal and to engage said second terminal to complete the circuit to the stop light.

4. A control means for a vehicle load compensating mechanism having a servo-motor, comprising a compensating switch device for controlling the operation of said servo-motor and adapted to be actuated in response to a change in static load on the vehicle, delayed action control means for said switch device, a casing having a fluid passage adapted to be connected to a fluid pressure conduit for the vehicle brakes for introducing fluid under pressure into said casing upon operation of the brakes, a movable switch in said casing normally maintained in position to connect said control switch device with a source of electric energy, and means in said casing responsive to fluid pressure in said fluid passage imposed by the operation of the vehicle brakes for moving said switch to disconnect said switch device from said source of electric energy.

5. In a vehicle having fluid actuated brakes and a control means for a load compensating mechanism, comprising a compensating switch device for said mechanism adapted to be actuated in response to a change in static load on the vehicle, delayed action control means for said switch device, a member having a conduit through which fluid is forced under pressure upon operation of the vehicle brakes, a casing having a fluid passage adapted to be connected to said conduit for introducing fluid under pressure into said casing upon operation of the brakes, a movable switch in said casing, spring means for normally maintaining said switch in position to connect said compensating switch device with a source of electric energy, and means in said casing responsive to fluid pressure in said fluid passage imposed by the operation of the vehicle brakes for moving said switch to disconnect said compensating switch device from said source of electric energy.

6. In a vehicle having fluid actuated brakes, load compensating mechanism for said vehicle, a compensating switch device for said mechanism adapted to be actuated in response to a change in static load on the vehicle, delayed action control means for said switch device, a member having a conduit through which fluid is forced under pressure upon operation of the vehicle brakes, a casing having a fluid passage adapted to be connected to said conduit for introducing fluid under pressure into said casing upon operation of the brakes, a movable switch in said casing, spring means for normally maintaining said switch in position to connect said compensating switch device with a source of electric energy, and flexible diaphragm means in said casing responsive to fluid pressure in said fluid passage imposed by the operation of the vehicle brakes for moving said switch to disconnect said compensating switch device from said source of electric energy.

7. In a vehicle having load compensating means including a servo-motor for levelizing the vehicle under conditions of varying static load thereon, a compensator control device comprising an electric circuit having electrical contact means therein operative in response to a static load change on the vehicle, a resistance winding in said circuit adapted to be heated by the electric current, bimetallic means actuated by said resistance winding for completing a control circuit for said servo-motor, and a fluid actuated pressure switch operative by pressure consequent to brake application for rendering said first named circuit inoperative.

8. In a vehicle having fluid actuated brakes, load compensating mechanism for said vehicle, a compensating switch device for said mechanism adapted to be actuated in response to a change in static load on the vehicle, a member having a conduit through which fluid is forced under pressure upon operation of the vehicle brakes, a casing having means for connection to said member and a passage communicating with said conduit, a switch in said casing normally electrically connecting said compensating switch device with a source of electric energy, and means in said casing controlled by fluid pressure in said passage imposed thereon by actuation of the vehicle brakes for operating said switch to disconnect said compensating switch device from said source.

9. In a vehicle having fluid actuated brakes, load compensating mechanism for said vehicle, a compensating switch device for said mechanism adapted to be actuated in response to a change in static load on the vehicle, delayed action control means for said switch device, a member having a conduit through which fluid is forced under pressure upon operation of the vehicle brakes, a casing having means for connection to said member and a passage communicating with said conduit, a switch in said casing, spring means acting on said switch for normally electrically connecting said compensating switch device with a source of electric energy, and flexible diaphragm means in said casing controlled by fluid pressure in said passage imposed thereon by actuation of the vehicle brakes for operating said switch to disconnect said compensating switch device from said source.

10. In a vehicle having load compensating means including a servo-motor for levelizing the vehicle under conditions of varying static load thereon, a compensator control device comprising an electric circuit having electrical contact means therein operative in response to a static load change on the vehicle, temperature responsive delayed action means controlled by the energization of said circuit for completing after an interval of time electric circuit means effective to actuate said servo-motor, and a fluid actuated pressure switch operative by pressure consequent to brake application for rendering said first named circuit inoperative.

11. In a vehicle having fluid actuated brakes and a control means for a vehicle load compensating mechanism having a servo-motor, comprising compensating electrical switch means for controlling the operation of said servo-motor and including relatively movable contact means adapted to coact in response to a change in static load on the vehicle, delayed action control means for said switch means, a pressure switch device adapted to be interposed in a conductor line leading from an electric source to one of said contact means, said device having a movable switch normally maintained in position to enable current to flow through said conductor line, and movable means controlled by fluid pressure imposed thereon by operation of said brakes for moving said switch to interrupt flow of current through said conductor line.

12. In a vehicle having fluid pressure brakes, a load compensating means for levelizing the vehicle under conditions of varying static load thereon and including a servo-motor, a compensator control device comprising electric circuit means having electrical contact means therein operative in response to increased or decreased static load changes on the vehicle, delayed action control means effective by the energization of said circuit means for actuating said servo-motor, and a fluid actuated pressure switch operative by pressure consequent to brake application for rendering said circuit means inoperative.

13. In a vehicle having fluid pressure brakes, load compensating means for levelizing the vehicle under conditions of varying static load thereon and including a servo-motor, a compensator control device comprising electric circuit means having electrical contact means therein operative in response to increased or decreased static load changes on the vehicle, delayed action means controlled by the energization of said circuit means for completing a second electrical circuit means effective to actuate said servo-motor, and a fluid actuated pressure switch operative by pressure consequent to brake application for rendering said first named circuit means inoperative.

References Cited in the file of this patent

UNITED STATES PATENTS

| | | |
|---|---|---|
| 1,850,626 | Hukill | Mar. 22, 1932 |
| 2,096,492 | Hewitt | Oct. 19, 1937 |
| 2,430,428 | Katcher | Nov. 4, 1947 |
| 2,506,726 | Magrum | May 9, 1950 |
| 2,522,129 | Mahring | Sept. 12, 1950 |
| 2,687,311 | Nallinger | Aug. 24, 1954 |
| 2,762,633 | Gouirand | Sept. 11, 1956 |